United States Patent Office 2,725,254
Patented Nov. 29, 1955

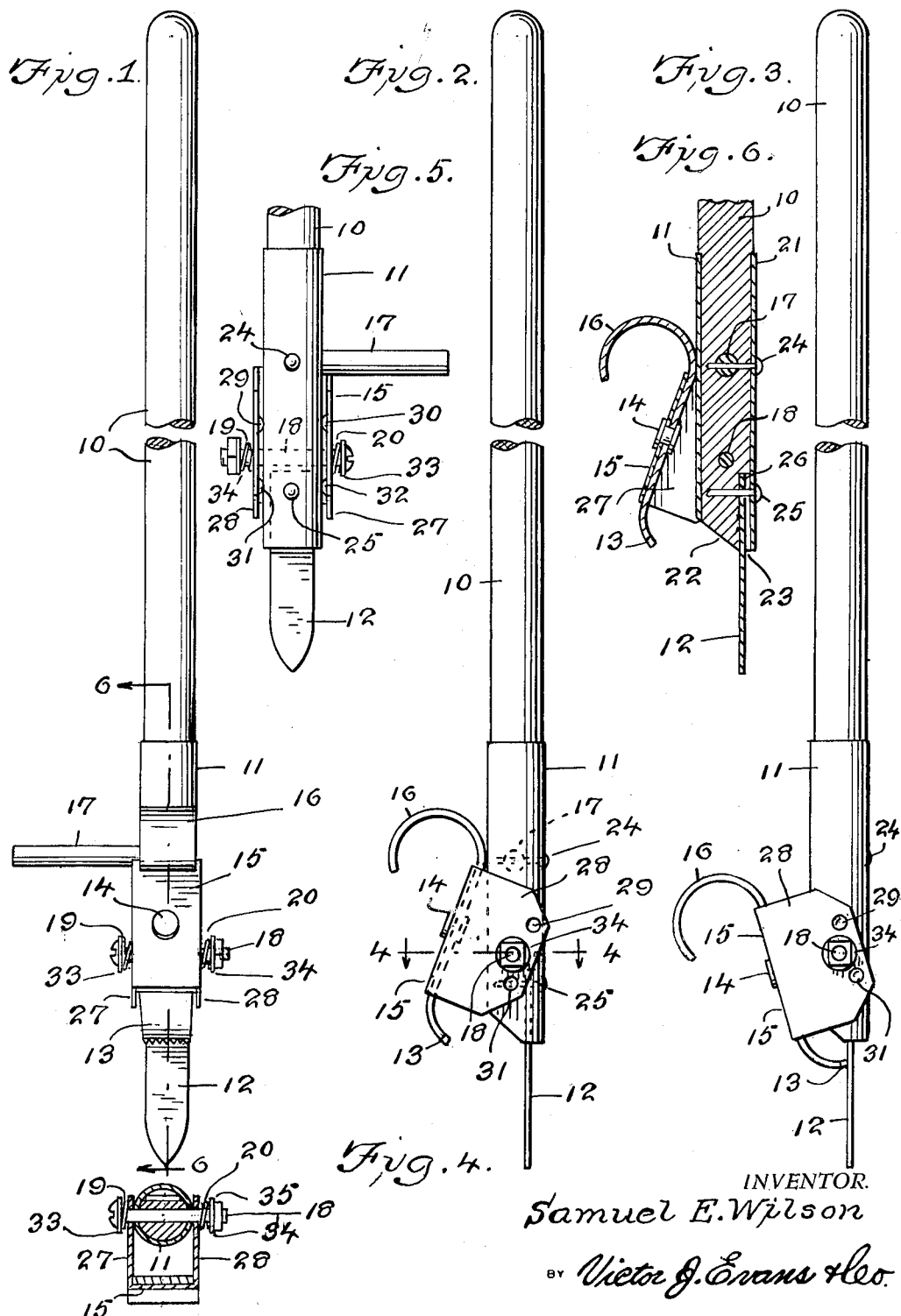
Nov. 29, 1955 — S. E. WILSON — 2,725,254
WEEDER WITH SNAP TYPE CLAMPING JAW
Filed Oct. 25, 1954
INVENTOR.
Samuel E. Wilson
BY Victor J. Evans & Co.
ATTORNEYS

2,725,254

WEEDER WITH SNAP TYPE CLAMPING JAW

Samuel E. Wilson, Los Angeles, Calif.

Application October 25, 1954, Serial No. 464,326

5 Claims. (Cl. 294—50.9)

This invention relates to garden tools particularly of the type used for removing weeds from lawns and the like, and in particular, an elongated handle with a foot rest extended from one side and with a point extended from the lower end, and a weed gripping jaw pivotally mounted on the lower end of the handle and adapted to be forced by a foot of the operator against the point to grip weeds whereby the body of a weed and also the root thereof may readily be extracted from the ground.

The purpose of this invention is to provide a weeding tool that is adapted to be operated by a person in an upright position and in which means is provided for positively gripping weeds and the like.

Various types of jaws for gripping weeds have been pivotally mounted on the lower ends of handles, however, with conventional types of weed pullers, it is difficult to force the jaws into the soil a sufficient distance to remove the entire root. With this thought in mind, this invention contemplates a weeder having a point rigidly mounted on the lower end of an elongated handle whereby the point is adapted to be forced into the soil, and a jaw pivotally mounted on the handle and adapted to coact with the point whereby with the jaw actuated by foot pressure it is possible to grip the body and root of a weed so that the entire weed may readily be removed.

The object of this invention is, therefore, to provide an improved weed puller that is adapted to be actuated with the operator in an upright position and that is adapted to grip the entire body of the weed.

Another object of the invention is to provide an improved weed puller that is adapted to be used for substantially all types of weeds.

A further object of the invention is to provide a weed puller that is adapted to be used with the operator in an upright position and that grips the entire weed in which the device is of a simple and economical construction.

With these and other objects and advantages in view, the invention embodies an elongated handle having a sleeve on the lower end with a blade having a point on the lower end extended from the end of the handle and with the weed gripping jaw pivotally mounted on the sleeve and adapted to be moved into engagement with the blade by foot pressure, and also with a foot rest extended from one side of the handle.

Other features and advantages of the invention will appear from the following description, taken in connection with the drawing, wherein:

Figure 1 is a front elevational view showing the improved weeder with a portion of the handle thereof broken away.

Figure 2 is a side elevational view of the weeder also with a portion of the handle broken away and showing the weed gripping jaw in the free or open position.

Figure 3 is a view similar to that shown in Figure 2 showing the weed gripping jaw in the position of gripping a weed between the jaw and blade.

Figure 4 is a sectional plan through the lower end of the weeder taken on line 4—4 of Figure 2.

Figure 5 is a rear elevational view of the weeder with the upper portion of the handle broken away illustrating the mounting of the gripping jaw on the handle.

Figure 6 is a vertical section through the lower portion of the weeder taken on line 6—6 of Figure 1.

Referring now to the drawing, wherein like reference characters denote corresponding parts, the improved weeding tool of this invention includes a handle 10 having a sleeve 11 positioned on the lower end, a soil piercing blade 12 extended from the lower end of the handle, a weed gripping jaw 13 secured by a rivet 14 in a U-shaped bracket 15 and having an arcuate foot engaging loop 16 extended from the upper end, a foot rest or bar 17 extended from one side of the handle and a bolt 18 having springs 19 and 20 on ends thereof extended through arms at the sides of the bracket and also through the sleeve and handle for pivotally mounting the weed gripping jaw 13 on the lower end of the handle.

The sleeve 11, as illustrated in Figure 6, is mounted on a reduced portion 21 at the lower end of the handle and both the lower end of the sleeve and handle are formed with a beveled surface 22 which provides a comparatively low supporting point 23 for the blade 12. The sleeve is retained in position with pins or brads 24 and 25 which extend into the handle and, also as shown in Figure 6, the pin 24 extends through the pin 17, which forms a foot rest, and the pin 25 extends through the upper part of the blade 12 thereby securing the blade in position in a recess 26 in the lower part of the handle.

The arms 27 and 28 of the bracket 15, through which the bolt 18 extends, as shown in Figure 4, are provided with upper projections or nodes 29 and 30 and lower projections or nodes, as indicated by the numerals 31 and 32, respectively, whereby with the nodes positioned to straddle the center of the handle or sleeve 11, the bracket is held with the jaw 13 in the open position or with the jaw in the closed or gripping position. As the jaw is actuated by foot pressure on the loop 16, the arms are spread against the springs 19 and 20 whereby the nodes pass over the center and the gripping jaw snaps into gripping relation with a weed positioned against the blade 12.

The bolt 18 is provided with washers 33 and 34 against which the outer ends of the springs 19 and 20 are positioned and the parts are retained in assembled relation with a nut 35.

With the parts assembled as illustrated and described, the prong or blade 12 is pressed into the soil on one side of a weed and with the blade in position a foot of the operator is placed upon the loop 16 forcing the bracket downwardly from the position shown in Figure 2 to that shown in Figure 3 whereby the jaw 13 grips the weed against the surface of the blade 12 with a force exerted substantially perpendicular to the blade and with the gripping edge of the jaw contacting the blade at a point substantially midway between the pivotal mounting of the jaw and the extended end of the blade; and with the weed positively held in this manner both the body and root of the weed are readily extracted or withdrawn. The bracket is readily returned to the position shown in Figure 2 by striking the loop 16 thereof against a side of a box or other container into which the weed is deposited.

It will be understood that modifications, within the scope of the appended claims, may be made in the design and construction of the weed puller without departing from the spirit of the invention.

What is claimed is:

1. A weeding tool comprising a handle, a soil piercing blade extended from the lower end of the handle, and a bracket pivotally mounted on the lower end of the handle an arcuate gripping jaw carried by the bracket and adapted to be actuated by a foot of an operator to grip a weed against said blade, the length of the jaw being less than that of the blade and the gripping edge of the jaw being positioned to engage the blade at a point substantially midway between the extended end of the blade and the pivotal mounting of the bracket on the handle, and the jaw gripping the blade with a force in a plane perpendicular to the blade.

2. A weeding tool comprising a handle, a soil piercing blade extended from the lower end of the handle, a bracket pivotally mounted on the lower end of the handle an arcuate gripping jaw carried by the bracket and adapted to be actuated by a foot of an operator to grip a weed against said blade, and resilient means for retaining the jaw, selectively, in gripping relation with the blade or spaced from the blade, the length of the jaw being less than that of the blade and the gripping edge of the jaw being positioned to engage the blade at a point substantially midway between the extended end of the blade and the pivotal mounting of the bracket on the handle, and the jaw gripping the blade with a force in a plane perpendicular to the blade.

3. A weeding tool comprising a handle, a soil piercing blade extended from the lower end of the handle, a bracket pivotally mounted on the lower end of the handle an arcuate gripping jaw carried by the bracket and adapted to be actuated by a foot of an operator to grip a weed against said blade, and a foot rest extended from one side of the handle, the length of the jaw being less than that of the blade and the gripping edge of the jaw being positioned to engage the blade at a point substantially midway between the extended end of the blade and the pivotal mounting of the bracket on the handle, and the jaw gripping the blade with a force in a plane perpendicular to the blade.

4. In a weed extracting tool, the combination which comprises an elongated handle, a sleeve mounted on the lower end of the handle, a soil piercing blade having a point at the lower end mounted in and extended from the lower end of the handle, a U-shaped bracket having arms positioned on opposite sides of the handle, a bolt extended through the arms and handle for pivotally mounting the bracket on the handle, a jaw extended from the lower part of the bracket and positioned to coact with the blade extended from the end of the handle for gripping a weed or the like, the length of the jaw being less than that of the blade and the gripping edge of the jaw being positioned to engage the blade at a point substantially midway between the extended end of the blade and the pivotal mounting of the bracket on the handle, and the jaw gripping the blade with a force in a plane perpendicular to the blade a loop providing a foot rest extended from the upper end of the bracket, and a pin extended from one side of the handle providing means for pressing the blade at the lower end of the handle into the ground with the foot of an operator.

5. In a weed extracting tool, the combination which comprises an enlongated handle, a sleeve mounted on the lower end of the handle, a blade having a point at the lower end mounted in and extended from the lower end of the handle, a U-shaped bracket having arms positioned on opposite sides of the handle, a bolt extended through the arms and handle for pivotally mounting the bracket on the handle, a jaw extended from the lower part of the bracket and positioned to coact with the blade extended from the end of the handle for gripping a weed or the like, a loop providing a foot rest extended from the upper end of the bracket, a pin extended from one side of the handle providing means for pressing the blade at the lower end of the handle into the ground with the foot of an operator, springs on the ends of the bolt and positioned against the arms of the bracket, and nodes extended inwardly from inner surfaces of the arms of the bracket and positioned to retain the bracket with the weed gripping jaw spaced from the blade and also with the jaw in gripping relation with the blade.

References Cited in the file of this patent

UNITED STATES PATENTS 1,634,606    Bartlebaugh _____ July 5, 1927

FOREIGN PATENTS 40,157    Germany _____ July 30, 1887